US008928299B2

(12) United States Patent
Matzberger et al.

(10) Patent No.: US 8,928,299 B2
(45) Date of Patent: Jan. 6, 2015

(54) LOW POWER SWITCHING DC-DC CONVERTER AND METHOD OF THE SAME

(75) Inventors: Markus Matzberger, Tiefenbach (DE); Konrad Wagensohner, Mauern (DE); Erich Bayer, Thonhausen (DE)

(73) Assignee: Texas Instruments Deutschland GmbH, Freising (DE)

( * ) Notice: Subject to any disclaimer, the term of this patent is extended or adjusted under 35 U.S.C. 154(b) by 234 days.

(21) Appl. No.: 13/481,541

(22) Filed: May 25, 2012

(65) Prior Publication Data

US 2013/0314067 A1 Nov. 28, 2013

(51) Int. Cl.
*G05F 3/08* (2006.01)
*H02M 3/158* (2006.01)
*H02M 1/00* (2006.01)

(52) U.S. Cl.
CPC .... H02M 3/1588 (2013.01); *H02M 2001/0009* (2013.01); *H02M 3/158* (2013.01)
USPC ............................ 323/282; 323/284; 323/311

(58) Field of Classification Search
CPC ..... H02M 3/155; H02M 3/156; H02M 3/158; H02M 3/1588; G05F 3/02; G05F 3/08
USPC .................. 323/282–285, 311, 350
See application file for complete search history.

(56) References Cited

U.S. PATENT DOCUMENTS

| 5,481,178 | A  | * | 1/1996  | Wilcox et al. | 323/287 |
|---|---|---|---|---|---|
| 2006/0119338 | A1 | * | 6/2006  | Soch | 323/283 |
| 2007/0085522 | A1 | * | 4/2007  | Mariani et al. | 323/284 |
| 2010/0237841 | A1 | * | 9/2010  | Matsuo et al. | 323/282 |
| 2010/0308784 | A1 | * | 12/2010 | Scoones et al. | 323/282 |
| 2011/0241641 | A1 | * | 10/2011 | Chen et al. | 323/284 |
| 2011/0291632 | A1 | * | 12/2011 | Yu et al. | 323/283 |
| 2012/0217946 | A1 | * | 8/2012  | Ju | 323/285 |
| 2013/0049715 | A1 | * | 2/2013  | Groom et al. | 323/271 |

* cited by examiner

*Primary Examiner* — Timothy J Dole
*Assistant Examiner* — Shahzeb K Ahmad
(74) *Attorney, Agent, or Firm* — William B. Kempler; Frederick J. Telecky, Jr.

(57) ABSTRACT

A low power DC-DC converter includes a converter stage coupled to an input node, and having a low side switch and a rectifier switch. A peak current detector senses a current at the low side switch and a zero current detector senses a current at the rectifier switch. It is configured to set the low side switch to a non-conductive state and the rectifier switch to a conductive state if the peak current detector detects a predetermined peak current. It is configured to set the rectifier switch to a non-conductive state if the zero current detector detects zero current at the rectifier switch. A time interval between subsequent current peaks is triggered by a charge comparator receiving an average current fed to the low side and rectifier switches from the input node and a reference current coupled to the charge comparator by a reference current source.

8 Claims, 4 Drawing Sheets

LOW POWER SWITCHING DC-DC CONVERTER AND METHOD OF THE SAME

FIELD OF THE INVENTION

The invention relates to a low power DC-DC converter, comprising a converter stage, a peak current detector, a zero current detector and a stage for determining a cycle time. Further, the invention relates to a method of operating the DC-DC converter.

BACKGROUND

Today's DC-DC converters (for example a boost- or a buck-converter, a boost-buck converter or a SEPIC) operate at a low conversion efficiency at small input currents. Traditional regulation loops, for example pulse width modulation (PWM) control or continuous conduction mode, are not suitable for small input currents and lead to low conversion efficiency. In particular for input currents in a range between several μA and about 100 mA, DC-DC converters according to the prior art lack stable operation and have high quiescent current consumption. For power sources having a high impedance characteristic, a DC-DC converter is needed which has an adjustable input current limit to charge up for example a storage capacitor or a battery from a low power source.

SUMMARY

It is a general object of the invention to provide a low power DC-DC converter and a method of operating a low power DC-DC converter, which offers a higher conversion efficiency at small input currents.

According to an aspect of the invention, a low power DC-DC converter is provided. The DC-DC converter comprises a converter stage which is coupled to an input node. The converter stage of the DC-DC converter comprises a low side switch and a rectifier switch, wherein the rectifier switch is coupled to an output node for providing a load current to a load. The low power DC-DC converter according to aspects of the invention further comprises a peak current detector for sensing a current at the low side switch. Further, the DC-DC converter comprises a zero current detector for sensing a current at the rectifier switch. The low power DC-DC converter is configured to set the low side switch to a non-conductive state and the rectifier switch to a conductive state if the peak current detector detects that a predetermined peak current value is reached. The DC-DC converter according to aspects of the invention is further configured to set the rectifier switch to a non-conductive state if the zero current detector detects that zero current is reached at the rectifier switch. Due to the switching operation of the low side switch and the rectifier switch, a current peak is drawn from the input node. A cycle time which defines a time interval between subsequent current peaks is triggered by a charge comparator receiving an averaged current which is fed to the low side switch and to the rectifier switch from the input node. Further, a reference current is coupled to the charge comparator wherein the predetermined reference current is provided by a reference current source.

The low power DC-DC converter may provide a suitable and accurate input current limit control for low and lowest input currents using a peak current detection. The peak current in an inductor of the DC-DC converter may be determined. The low power DC-DC converter according to aspects of the invention is designed for ultra-low power consumption and at the same time it applies a minimum amount of components to reach highest conversion efficiency. Advantageously, no complex regulation loop is necessary. The low power DC-DC converter according to aspects of the invention is stable with respect to different capacities and inductances which may be coupled to the output node. The DC-DC converter according to aspects of the invention may be a buck converter, a boost converter, a boost-buck converter or a SEPIC converter. The particular converter topology may be provided by assigning the cycle time of the low power DC-DC converter. The cycle time may be adjusted via the reference current.

According to an embodiment of the invention, the low power DC-DC converter further comprises a first comparator for activating and for deactivating the converter stage. The comparator may be coupled to an output voltage of the converter stage and to a first reference voltage. Active time of the DC-DC converter may be minimized due to the output voltage dependent activation and deactivation of the converter stage. Stable operation is maintained while efficiency of the power conversion is increased.

According to an alternative embodiment of the invention, the low power DC-DC converter comprises a linear stage for activating and for deactivating the converter stage. The linear stage is coupled to an output voltage of the converter stage and to a first reference voltage. The linear stage is configured to generate an increasing current if the output voltage drops below the first reference voltage. Further, the increasing current of the linear stage is coupled to the first reference current input of the charge comparator. According to an embodiment of the invention, the low power DC-DC converter further comprises a second comparator for activating and for deactivating the converter stage. The second comparator is coupled to the output voltage of the converter stage and to a second reference voltage. The second reference voltage is the first reference voltage plus a voltage offset.

The linear stage may couple a control current to the reference current input of the charge comparator. As a result, a cycle time generator of the low power DC-DC converter operates like a voltage-controlled timer.

According to another embodiment of the invention the low power DC-DC converter comprises a minimum current source which is coupled to an input of the charge comparator receiving the reference current of the reference current source. This is to provide the input of the charge comparator with a minimum current. The low power DC-DC converter according to aspects of the invention is further configured to couple the minimum current source to the input of the charge comparator before the second comparator deactivates the converter stage. The second comparator operates like a skip comparator and the minimum current source sets the cycle time of the cycle time generator or stage of the low power DC-DC converter to a maximum cycle time before the skip comparator deactivates the converter stage.

According to another aspect of the invention, a method of operating a DC-DC converter is provided. The DC-DC converter comprises a converter stage which is coupled to an input node. The converter stage further comprises a low side switch and a rectifier switch which is coupled to an output node for providing a load current to a load. The DC-DC converter further comprises a peak current detector for sensing a current at the low side switch and a zero current detector for sensing a current at the rectifier switch. The low side switch is set to a non-conductive state and the rectifier switch is set to a conductive state if the peak current detector detects a predetermined peak current. Further, the rectifier switch is set to a non-conductive state if the zero current detector detects that zero current is reached at the rectifier switch. A cycle time, which is the time interval between subsequent current peaks (which are due to the switching operation of the low side switch and the rectifier switch), is triggered by comparing a charge at a charge comparator. The charge comparator receives an average current fed to the low side switch and to a rectifier switch from the input node and a reference current coupled to the charge comparator by a reference current source. Same or similar advantages which have been already mentioned with respect to the low power DC-DC converter according to aspects of the invention apply to the method according to aspects of the invention in a same or similar way and are therefore not repeated.

BRIEF DESCRIPTION OF DRAWINGS

Further aspects of the invention will appear from the appending claims and from the following detailed description given with reference to the appending drawings:

DETAILED DESCRIPTION OF EXAMPLE EMBODIMENTS

Figure 2:
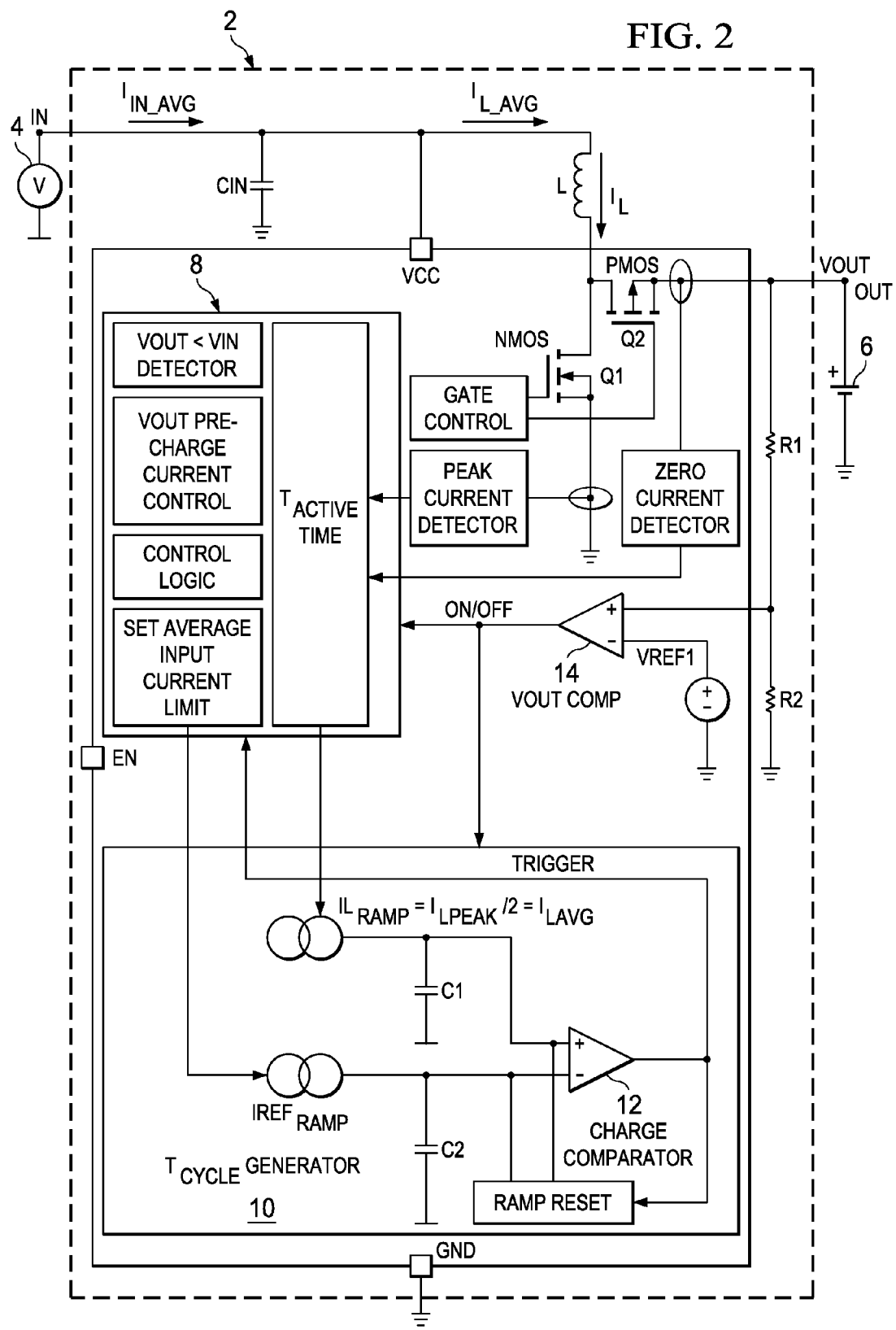
FIGS. 2 to 4 are simplified circuit diagrams of DC-DC converters according to embodiments of the invention.
Figure 3:
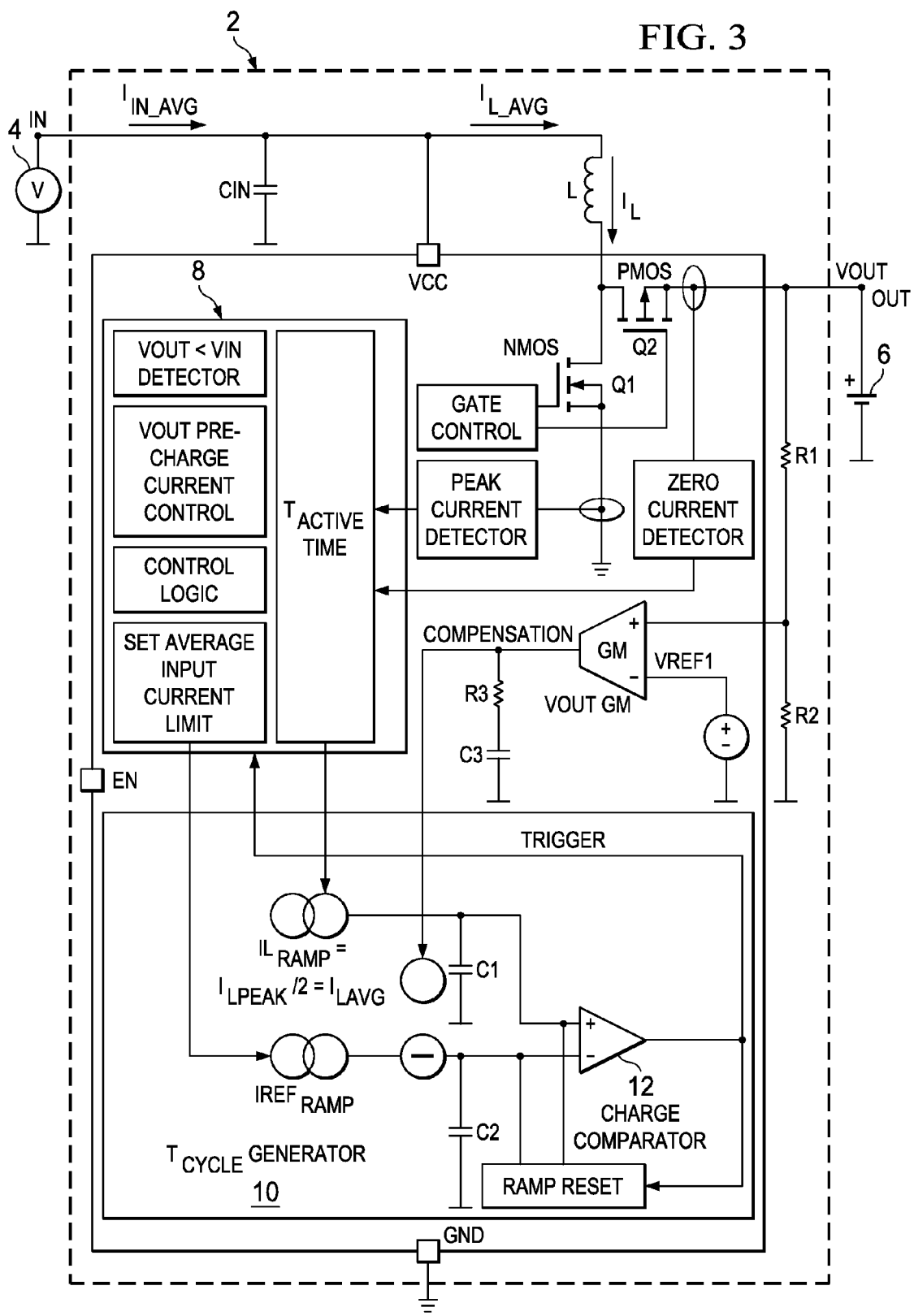
Figure 4:
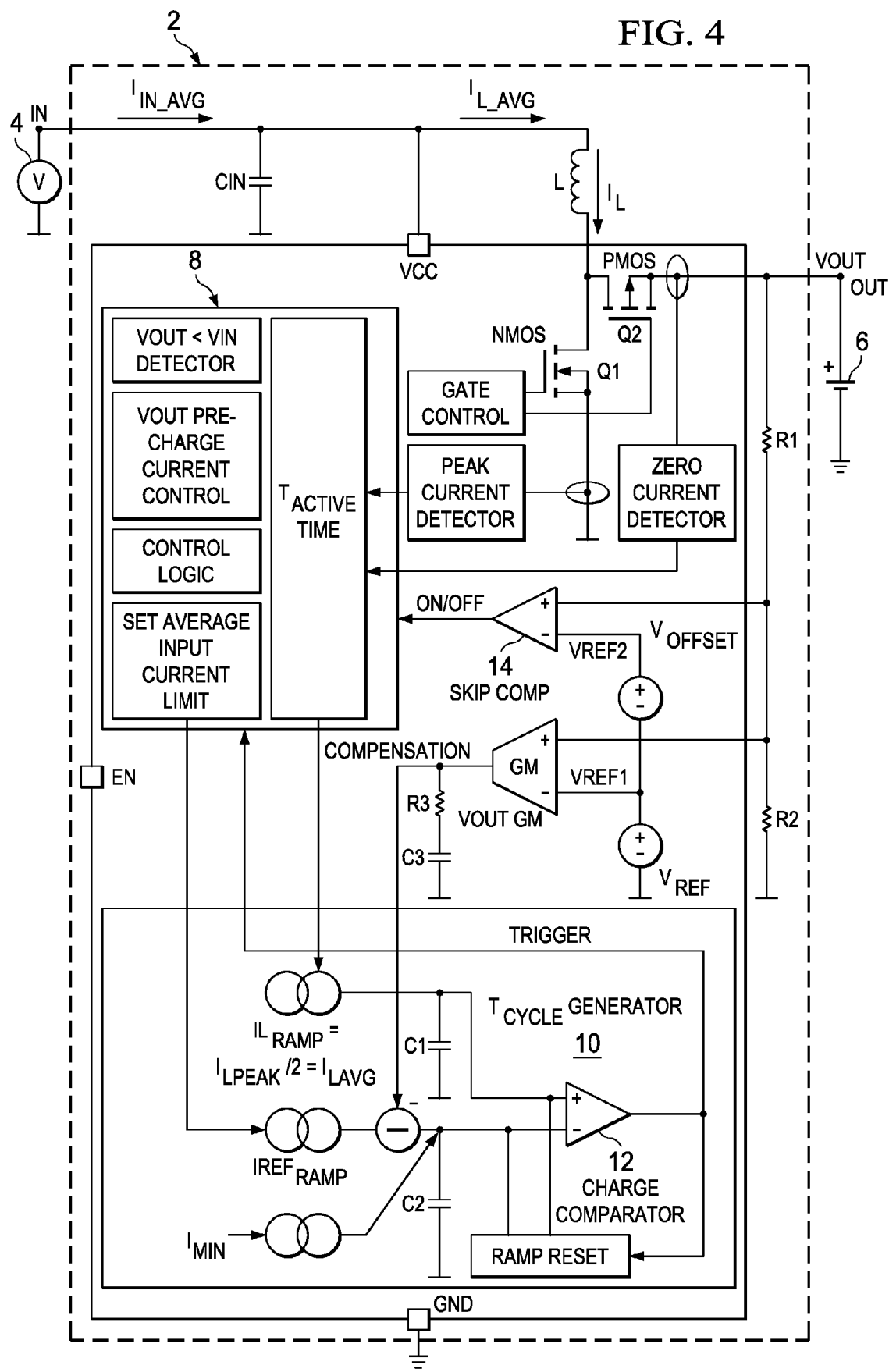

In a low power DC-DC converter 2, according to one of the embodiments in FIGS. 2 to 4, a power source 4 with a high impedance characteristic providing a small current is coupled to an input node IN. The small current is in a range from several µA up to about 100 mA. A load 6 is coupled to an output node OUT. The load 6 may be a capacitive load such as a storage capacitor or a battery (not shown). Further, the low power DC-DC converters 2 according to the embodiments comprises an enable pin EN and a ground pin GND. An input capacitor CIN is coupled between the input node IN and ground. A supply voltage pin VCC of the low power DC-DC converter 2 is further coupled to the input voltage provided at the input node IN.

A converter stage of the low power DC-DC converter 2, according to the embodiments in FIGS. 2 to 4, comprises an inductance L which is coupled to the input node IN at a first side and on the second side to a low side switch Q1 and to a rectifier switch Q2. The low side switch Q1 is coupled between the second side of the inductance L and ground. The rectifier switch Q2 is coupled between the second side of the inductance L and the output node OUT. Both switches Q1 and Q2 are controlled via a suitable gate control stage, and by way of an example only, the low side switch Q1 is an NMOS transistor and the rectifier switch Q2 is a PMOS transistor. A current at the low side switch Q1 is detected by a peak current detector. In other words, the peak current detector detects a current through the channel of the NMOS transistor Q1. A current at the rectifier switch Q2 is detected by a zero current detector. In other words, the zero current detector detects if a current through the channel of the rectifier switch Q2 is identical to zero. The peak current detector is configured to detect if the current at the low side switch Q1 exceeds a predetermined threshold. If so, a signal is communicated to the controller 8. If the current, at the rectifier switch Q2, equals zero, this is communicated by the zero current detection circuit to the controller 8 by sending a suitable signal.

In the following example, the general operation of the low power DC-DC converters 2 in the embodiments of FIGS. 2 to 4 will be explained by making reference to FIGS. 1a to 1c. In principle, the input current $I_L$ at the inductor L is determined using an accurate peak (inductor) current detector. Furthermore, there is an active time detector and a cycle generator which will be explained below. The peak current detector is appropriately defined for a certain input current range. For a short time, $T\_{ACTIVE}$ (see FIG. 1a) a pulse current is drawn from the input capacitor CIN. This current is many times higher than the desired average input current $I\_{IN\_AvG}$ (see FIG. 1b). Detection of the peak current $I\_{L\_PEAK}$ allows a determination of the average inductor current $I\_{L\_AVG}$. The average inductor current $I\_{L\_AVG}$ may be calculated by the formula:

$$I\_{L\_AVG} = 0.5 * I\_{L\_PEAK}$$

The input capacitor CIN averages the pulsating inductor current $I_L$ (see FIGS. 2 to 4). The current $I_{L\_AVG}$ drawn from the input node IN is the average current resulting from the average inductor current $I_L$ multiplied by the operation duty cycle $T\_{ACTIVE}$. $T\_{ACTIVE}$ is the time when current flows from the input capacitor CIN into the inductor L. By way of an example only, in a boost converter application, the time $T\_{ACTIVE}$ is the time when the low side switch Q1 is set to a conductive state and the rectifier switch Q2 is set to a non-conductive state. The average current $I\_{L\_AVG}$ flowing in the inductor during the time $T\_{ACTIVE}$ is equal to $0.5*I\_{L\_PEAK}$.

Figure 1A:
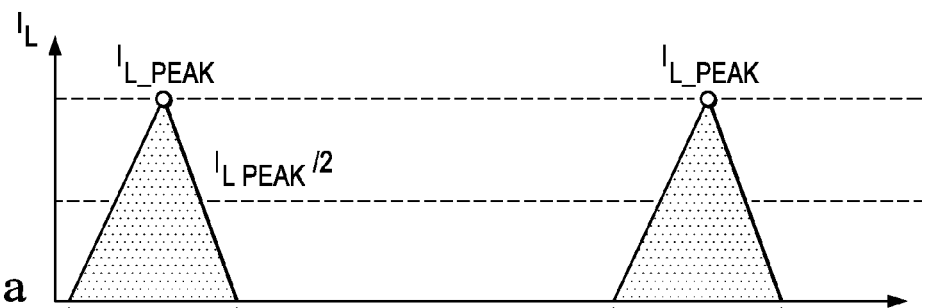
FIGS. 1a to 1c are simplified time-dependent diagrams showing a load current (FIG. 1a), an average load current (FIG. 1b) and ramp voltage for determination of a cycle time (FIG. 1c), in a DC-DC converter according to embodiments of the invention.
Figure 1B:
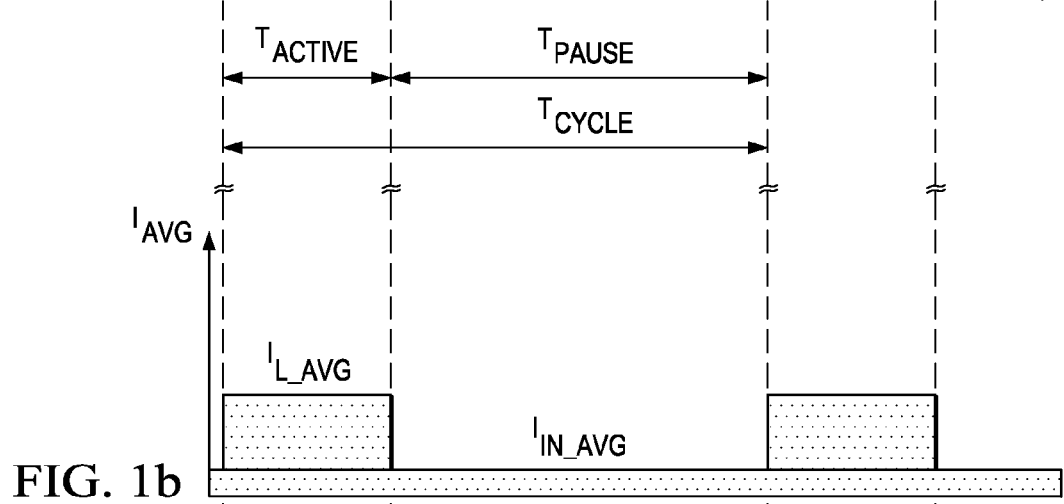
Figure 1C:
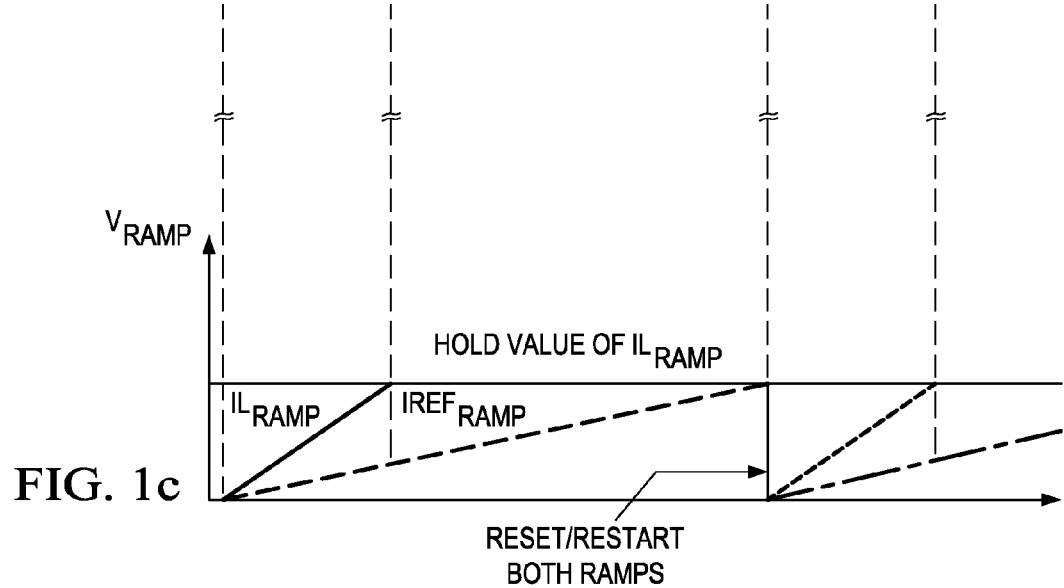

In a boost converter configuration, the low side switch Q1 is set to a conductive state and the inductor current $I_L$ ramps up from zero to $I\_{L\_PEAK}$ (see FIG. 1a). Once the peak inductor current $I\_{L\_PEAK}$ is reached, the peak current detector communicates a signal to the controller 8 which causes the gate control to switch off (set to a non-conductive state) the low side switch Q1. At the same moment, the gate control sets the rectifier switch Q2 to a conductive state. Accordingly, the inductor current $I_L$ ramps down and if zero current is detected by help of the zero current detector at the rectifier switch Q2, the zero current detector communicates a signal to the controller 8 which causes the gate control to set the rectifier switch Q2 to a non-conductive state. The result is the triangular inductor current pulse shown in FIG. 1a. After the active time $T\_{ACTIVE}$, charge transfer is finished from the input node IN to the output node OUT. Subsequently, the converter stage of the low power DC-DC converter 2 may be disabled during the time $T\_{PAUSE}$. A new cycle is started after the cycle time $T\_{CYCLE}$.

The cycle time $T\_{CYCLE}$ is the time between two subsequent current pulses and is generated by the timing circuit 10. A charge comparator 12 is coupled to a first and second capacitor C1, C2 and compares the different voltage slopes of the voltage across the first and the second capacitor C1, C2, respectively. A first slope at the first capacitor C1 is defined by a ramp current $I\_{L\_RAMP}$ (see FIG. 1c), multiplied by $T\_{ACTIVE}$. The corresponding ramp voltage $V\_{RAMP}$ represents the charge transmitted from the input capacitor CIN to the inductance L during the active time $T\_{ACTIVE}$. A second voltage slope across the second capacitor C2 is defined by a reference $I\_{REF\_RAMP}$ generated by the reference current source which is coupled to the inverting input of the charge comparator 12. The ramp voltage slope is defined by the reference current $I\_{REF\_RAMP}$, multiplied by the cycle time $T\_{CYCLE}$. The reference current $I\_{REF\_RAMP}$ is set by an average input current limiting circuit which is a part of the controller 8. Both slopes start synchronously at the beginning of the cycle.

The DC-DC converter 2 operates in the above-described mode until the target output voltage at the storage capacitor is met. In a boost converter configuration, a VOUT pre-charge circuit has to charge up the output with the adjusted input current until VOUT is equal to VIN.

The ramp current $I_{L\_RAMP}$ which is coupled to the non-inverting input of the charge comparator 12 is equal to $0.5*I_{L\_PEAK}$ which is the average current $I_{L\_AVG}$ across the inductor L. Due to simplification in the circuit diagrams of FIGS. 2 to 4, a separate current source is depicted for the current $I_{L\_AVG}$. If the charge comparator 12 detects equal voltages at both inputs, a trigger signal is communicated to the controller 8 and the cycle will restart. Accordingly, the ramp voltages will be reset by a suitable ramp reset circuit.

The converter stage of the low power DC-DC converter 2, according to the embodiment in FIG. 2, is controlled by a hysteretic control. The voltage VOUT at the output node OUT is detected by a first comparator 14. An inverting input of the comparator 14 is coupled to a voltage divider comprising a first resistor R1 and a second resistor R2 for sensing the voltage VOUT at the output node OUT. A non-inverting input of the comparator 14 is coupled to a first reference voltage $V_{REF1}$ provided by a first reference voltage source. The output of the first comparator 14 communicates a signal "ON/OFF" for activating or deactivating the controller 8. Once the output voltage VOUT has reached a predetermined level which is defined by the first reference voltage $V_{REF1}$, the converter stage of the low power DC-DC converter 2 is switched off.

According to the embodiment of FIG. 3, a linear control instead of a comparator is implemented. A GM-stage is coupled to a voltage divider comprising the first and second resistor R1, R2 and to the first reference voltage source providing the first reference voltage $V_{REF1}$. Upon detection of equal voltages, (i.e. the output voltage VOUT exceeds a certain threshold defined by the first reference voltage $V_{REF1}$), the GM-stage generates an increasing current. This current is subtracted from the reference current $I_{REF\_RAMP}$. According to the embodiment of FIG. 3, the low power DC-DC converter 2 operates like a voltage-controlled timer. The output of the GM-stage is further coupled to a resistor R3 which is coupled in series with a capacitor C3. The resistor R3 and the capacitor C3 are coupled in series between the output of the GM-stage and ground for smoothening the output signal of the GM-stage.

The low power DC-DC converter 2, according to the embodiment of FIG. 4, further comprises a second comparator 14 which acts as a skip comparator. The inverting input of the skip comparator 14 is coupled to the voltage divider, comprising the first and the second resistor R1, R2. The non-inverting input of the skip comparator 14 is coupled to a second reference voltage source which is coupled in series with the first reference voltage source providing the first reference voltage $V_{REF1}$. Accordingly, the skip comparator 14 is provided with a second reference voltage $V_{REF2}$ which is equal to $V_{REF1}+V_{OFFSET}$, wherein $V_{OFFSET}$ is the voltage generated by the second reference voltage source. The skip comparator 14 is for communicating a signal "ON/OFF" to the controller 8 for activating or deactivating the converter stage. This is for minimizing the quiescent current of the DC-DC converter 2 and increasing the efficiency at very light load conditions. Further, a minimum current $I_{MIN}$ is coupled to the inverting input of the charge comparator 12 receiving the reference current $I_{REF\_RAMP}$ before the skip comparator 14 shuts down the system. Accordingly, the cycle time $T_{CYCLE}$ is set to a maximum value before the skip comparator 14 powers down the converter stage.

Although the invention has been described in detail, it should be understood that various changes, substitutions and alterations, may be made thereto without departing from the spirit or scope of the invention as defined by the appended claims.

The invention claimed is:

1. A low power DC-DC converter, comprising:
a converter stage coupled to an input node;
the converter stage having a low side switch and a rectifier switch which is coupled to an output node for providing a load current to a load;
the DC-DC converter further comprising a peak current detector for sensing a current at the low side switch and a zero current detector for sensing a current at the rectifier switch;
wherein the DC-DC converter is configured to set the low side switch to a non-conductive state and the rectifier switch to a conductive state if the peak current detector detects that a predetermined peak current is reached and wherein the DC-DC converter is further configured to set the rectifier switch to a non-conductive state if the zero current detector detects that zero current is reached at the rectifier switch; and
wherein a cycle time defining a time interval between subsequent current peaks is triggered by a charge comparator coupled to a first capacitor and receiving an averaged current feed to the low side switch and to the rectifier switch from the input node to generate a first ramp and a reference current coupled to a second capacitor and the charge comparator by a reference current source to generate a second ramp, the comparator triggering a switching cycle when voltage across the second capacitor exceeds voltage across the first capacitor, further comprising a minimum current source which is coupled to an input of the charge comparator receiving the reference current of the reference current source so as to provide the input of the charge comparator with a minimum current, wherein the DC-DC converter is configured to couple the minimum current source to the input of the charge comparator before the second comparator de-activates the converter stage.

2. The DC-DC converter according to claim 1, further comprising a first comparator for activating and de-activating the converter stage, wherein the comparator is coupled to an output voltage of the converter stage and to a reference voltage.

3. The DC-DC converter according to claim 1, further comprising a linear stage for activating and de-activating the converter stage, wherein the linear stage is coupled to an output voltage of the converter stage and to a first reference voltage, and wherein the linear stage is configured to generate an increasing current if the output voltage drops below the first reference voltage and the increasing current is coupled to the first reference voltage input of a comparator.

4. The DC-DC converter according to claim 3, further comprising a second comparator for activating and de-activating the converter stage, wherein the comparator is coupled to the output voltage of the converter stage and to a second reference voltage.

5. The DC-DC converter according to claim 4, wherein the second reference voltage is the first reference voltage plus a voltage offset.

6. A low power DC-DC converter, comprising:
a converter stage coupled to an input node;
the converter stage having a low side switch and a rectifier switch which is coupled to an output node for providing a load current to a load;

the DC-DC converter further comprising a peak current detector for sensing a current at the low side switch and a zero current detector for sensing a current at the rectifier switch;

wherein the DC-DC converter is configured to set the low side switch to a non-conductive state and the rectifier switch to a conductive state if the peak current detector detects that a predetermined peak current is reached and wherein the DC-DC converter is further configured to set the rectifier switch to a non-conductive state if the zero current detector detects that zero current is reached at the rectifier switch;

wherein a cycle time defining a time interval between subsequent current peaks is triggered by a charge comparator receiving an averaged current feed to the low side switch and to the rectifier switch from the input node and a reference current coupled to the charge comparator by a reference current source;

further comprising a linear stage for activating and de-activating the converter stage, wherein the linear stage is coupled to an output voltage of the converter stage and to a first reference voltage, and wherein the linear stage is configured to generate an increasing current if the output voltage drops below the first reference voltage and the increasing current is coupled to the first reference voltage input of the comparator;

a second comparator for activating and de-activating the converter stage, wherein the comparator is coupled to the output voltage of the converter stage and to a second reference voltage, wherein the second reference voltage is the first reference voltage plus a voltage offset; and a minimum current source which is coupled to an input of the charge comparator receiving the reference current of the reference current source so as to provide the input of the charge comparator with a minimum current, wherein the DC-DC converter is configured to couple the minimum current source to the input of the charge comparator before the second comparator de-activates the converter stage.

7. A method of operating a low power DC-DC converter comprising:

a converter stage coupled to an input node;

the converter stage having a low side switch and a rectifier switch which is coupled to an output node for providing a load current to a load;

the DC-DC converter further comprising a peak current detector for sensing a current at the low side switch and a zero current detector for sensing a current at the rectifier switch, the method comprising the steps of:

setting the low side switch to a non-conductive state and the rectifier switch to a conductive state if the peak current detector detects that a predetermined peak current is reached;

setting the rectifier switch to a non-conductive state if the zero current detector detects that zero current is reached at the rectifier switch; and triggering a cycle time defining a time interval between subsequent current peaks by comparing a charge at a charge comparator coupled to a first capacitor receiving an averaged current feed to the low side switch and to the rectifier switch from the input node to generate a first ramp and a reference current coupled to a second capacitor and the charge comparator by a reference current source to generate a second ramp, the comparator triggering a switching cycle when voltage across the second capacitor exceeds voltage across the first capacitor, further comprising a minimum current source which is coupled to an input of the charge comparator receiving the reference current of the reference current source so as to provide the input of the charge comparator with a minimum current, wherein the DC-DC converter is configured to couple the minimum current source to the input of the charge comparator before the second comparator de-activates the converter stage.

8. A low power DC-DC converter, comprising:

a converter stage coupled to an input node;

the converter stage having an inductor coupled between the input node and a low side switch and a rectifier switch which is coupled to an output node for providing a load current to a load;

the DC-DC converter further comprising a peak current detector for sensing a current at the low side switch and a zero current detector for sensing a current at the rectifier switch;

wherein the DC-DC converter is configured to set the low side switch to a non-conductive state and the rectifier switch to a conductive state if the peak current detector detects that a predetermined peak current is reached and wherein the DC-DC converter is further configured to set the rectifier switch to a non-conductive state if the zero current detector detects that zero current is reached at the rectifier switch, and wherein a cycle time defining a time interval between subsequent current peaks is triggered by a charge comparator receiving an averaged current feed to the low side switch and to the rectifier switch from the input node and a reference current coupled to the charge comparator by a reference current source;

a linear stage for activating and de-activating the converter stage, wherein the linear stage is coupled to an output voltage of the converter stage and to a first reference voltage, and wherein the linear stage is configured to generate an increasing current if the output voltage drops below the first reference voltage and the increasing current is coupled to the first reference voltage input of a comparator;

a second comparator for activating and de-activating the converter stage, wherein the comparator is coupled to the output voltage of the converter stage and to a second reference voltage comprising the first reference voltage plus a voltage offset; and a minimum current source which is coupled to an input of the charge comparator receiving the reference current of the reference current source so as to provide the input of the charge comparator with a minimum current, wherein the DC-DC converter is configured to couple the minimum current source to the input of the charge comparator before the second comparator de-activates the converter stage.

* * * * *